March 23, 1926.   C. B. DURHAM ET AL   1,577,793
AUTOMOBILE TRUNK RACK
Filed April 12, 1924

Inventors
Cady B. Durham &
Frank G. Farry
By Their Attorneys
Blackmore, Spencer & Hulit Patented Mar. 23, 1926.

1,577,793

UNITED STATES PATENT OFFICE.

CADY B. DURHAM AND FRANK G. FARRY, OF FLINT, MICHIGAN, ASSIGNORS TO GENERAL MOTORS CORPORATION, OF DETROIT, MICHIGAN, A CORPORATION OF DELAWARE.

AUTOMOBILE TRUNK RACK.

Application filed April 12, 1924. Serial No. 706,145.

*To all whom it may concern:*

Be it known that we, CADY B. DURHAM and FRANK G. FARRY, citizens of the United States, and residents of Flint, county of Genesee, and State of Michigan, have invented certain new and useful Improvements in Automobile Trunk Racks, of which the following is a full, clear, concise, and exact description, such as will enable others skilled in the art to which the invention relates to make and use the same, reference being made therein to the accompanying drawings, which form a part of this specification.

This invention relates to baggage supports for automobiles, and is illustrated as embodied in a sport model automobile having a rack at the rear end of the body. An object of the invention is to make it unnecessary to use a trunk of special shape to fit the curved rear end of the automobile body, so that a steamer trunk or other unspecialized trunk can be used when desired, and also to permit the use of a more inexpensive trunk as regular equipment. As one desirable arrangement, the rack comprises horizontal rails hooked at their forward ends substantially in line with the top of the body, to support the front face of a trunk which is rectangular in cross-section.

The above and other objects and features of the invention will be apparent from the following description of one illustrative embodiment shown in the accompanying drawings, in which.

Figure 1:
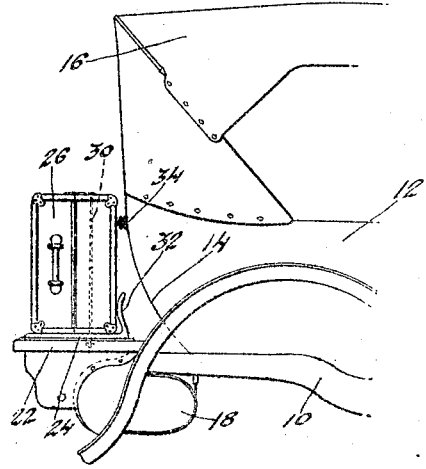
Figure 1 is a side elevation of part of the rear end of a Buick sport model automobile, showing the trunk and its rack.
Figure 2:
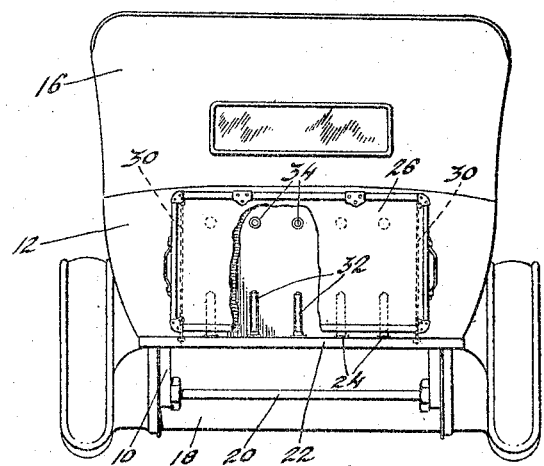
Figure 2 is a rear elevation of the parts shown in Figure 1.

The invention is shown as embodied in an automobile having a chassis frame 10, body 12 curved at 14 to form an overhanging portion in the usual manner, and top 16. Immediately above the fuel tank 18 and rear cross frame member 20 is a trunk rack comprising a platform 22 on which are arranged parallel trunk rails 24. Except as further described below, this is standard construction.

Figure 3:
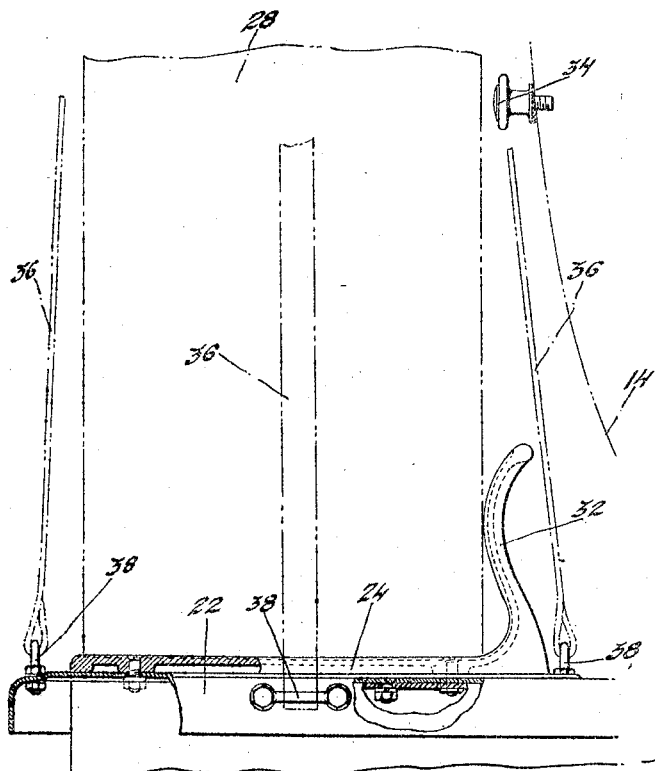
Figure 3 is a view corresponding to part of Figure 1, but on a larger scale, and showing the manner of strapping in place a steamer trunk or other unspecialized trunk.
Figure 4:
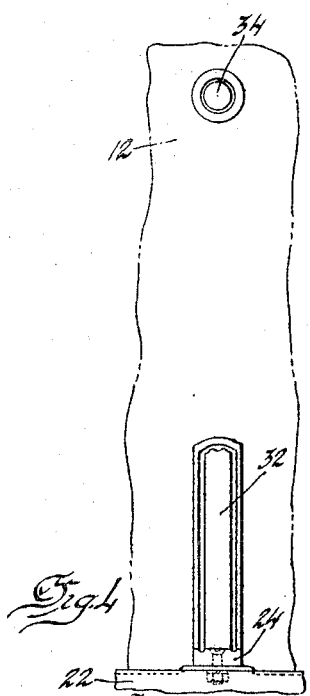
Figure 4 is a rear elevation of one of the hooked rails and a cooperating body-protecting knob immediately above it.

According to the present invention, a relatively inexpensive trunk 26 of rectangular cross-section is provided as regular equipment, and means is provided for securing on the rack when desired a steamer trunk 28 (Figure 3) or other unspecialized trunk. Preferably the trunk 26 furnished as regular equipment is formed with vertical sleeves through which pass clamping rods 30 threaded into the platform 22 or into the end rails 24.

In order to hold a trunk of this character firmly, each rail 24 has a hook portion 32 at its forward end, the various hook portions being in alinement transversely and being substantially in a vertical plane tangent to the upper part of the curved portion 14 of the body 12. Immediately above each of the hook portions 32 is a knob 34 carried by the body 12, and arranged to engage and support the top of the trunk. When a steamer trunk is carried, it is held by straps 36 passing through loops 38 at the front and rear, and at opposite ends, of the rack.

While one illustrative embodiment has been described in detail, it is not the intention to limit the scope of the invention to that particular embodiment, or otherwise than by the terms of the appended claims.

We claim:

1. A device for attachment to an automobile having a chassis frame, and a body on the frame curved at its rear end to provide an overhanging portion, comprising a trunk rack having parallel longitudinal rails for attachment to the chassis frame, each of said rails having a trunk-supporting vertical hook portion at its forward end, the various hook portions being in alinement with each other transversely and being substantially in a plane tangent to the upper part of the curved end of the body vertically, means substantially in said tangent plane vertically above said hook portions and carried by the body for engaging and supporting the top of a trunk on the rack, and means for holding a rectangular trunk on said rails with its front face in supporting engagement with said hook portions and said means on the body.

2. A device for attachment to an automobile having a chassis frame, and a body on the frame curved at its rear end to provide an overhanging portion, comprising a trunk rack having parallel longitudinal rails for attachment to the chassis frame, each of said rails having a trunk-supporting vertical hook portion at its forward end, the various hook portions being in alinement with each other transversely and being substantially in a plane tangent to the upper part of the curved end of the body vertically, knobs substantially in said tangent plane vertically above said hook portions and carried by the body for engaging and supporting the top of a trunk on the rack, and loops to receive straps holding a rectangular trunk on said rails with its front face in supporting engagement with said hook portions and said knobs.

3. In the combination as set forth in claim 2, said trunk being provided with clamping devices passing therethrough and concealed therein, and means associated with the ends of said devices and the trunk rack for clamping the trunk upon the rack.

In testimony whereof we affix our signatures.

C. B. DURHAM.
FRANK G. FARRY.